(12) United States Patent
Hung

(10) Patent No.: US 7,267,154 B1
(45) Date of Patent: Sep. 11, 2007

(54) WATER-PROOF FILM LAMINATING MACHINE

(76) Inventor: Kuen-Yuan Hung, No. 21, Lane 190, Sec. 1, Hansi W. Rd., East Dist., Taichung (TW)

( * ) Notice: Subject to any disclaimer, the term of this patent is extended or adjusted under 35 U.S.C. 154(b) by 0 days.

(21) Appl. No.: 11/455,745

(22) Filed: Jun. 20, 2006

(51) Int. Cl.
*B32B 37/00* (2006.01)

(52) U.S. Cl. ............. 156/497; 156/498; 156/499; 156/555; 156/582

(58) Field of Classification Search ........... 156/82, 156/497, 498, 499, 552, 555, 580, 582, 583.1; 100/327, 160, 176
See application file for complete search history.

(56) References Cited

U.S. PATENT DOCUMENTS 4,608,114 A * 8/1986 Nakao ................. 156/497
6,053,230 A * 4/2000 Pelland ................ 156/359
6,129,809 A * 10/2000 Ellenberger et al. ..... 156/351
6,789,592 B2 * 9/2004 Biro et al. ............ 156/391

* cited by examiner

*Primary Examiner*—James Sells
(74) *Attorney, Agent, or Firm*—Hershkovitz & Associates; Abe Hershkovitz

(57) ABSTRACT

A water-proof film laminating machine has a laminating machine body, a top roller, a bottom roller, multiple connecting devices, a cylinder, a first holder, a second holder and a cooling device. The holders are connected to the connecting devices and driven by the cylinder. The holders provide heat to melt a film attaching on a texture and the holders can be adjusted to focus on the film precisely. The cooling device cools down a high temperature from the melting film. When the water-proof film laminating machine is in use, a texture is put between the rollers and the film is attached on texture by melting the film. By adjusting the holders, the film will attach to the texture precisely and be cooled down quickly.

3 Claims, 6 Drawing Sheets

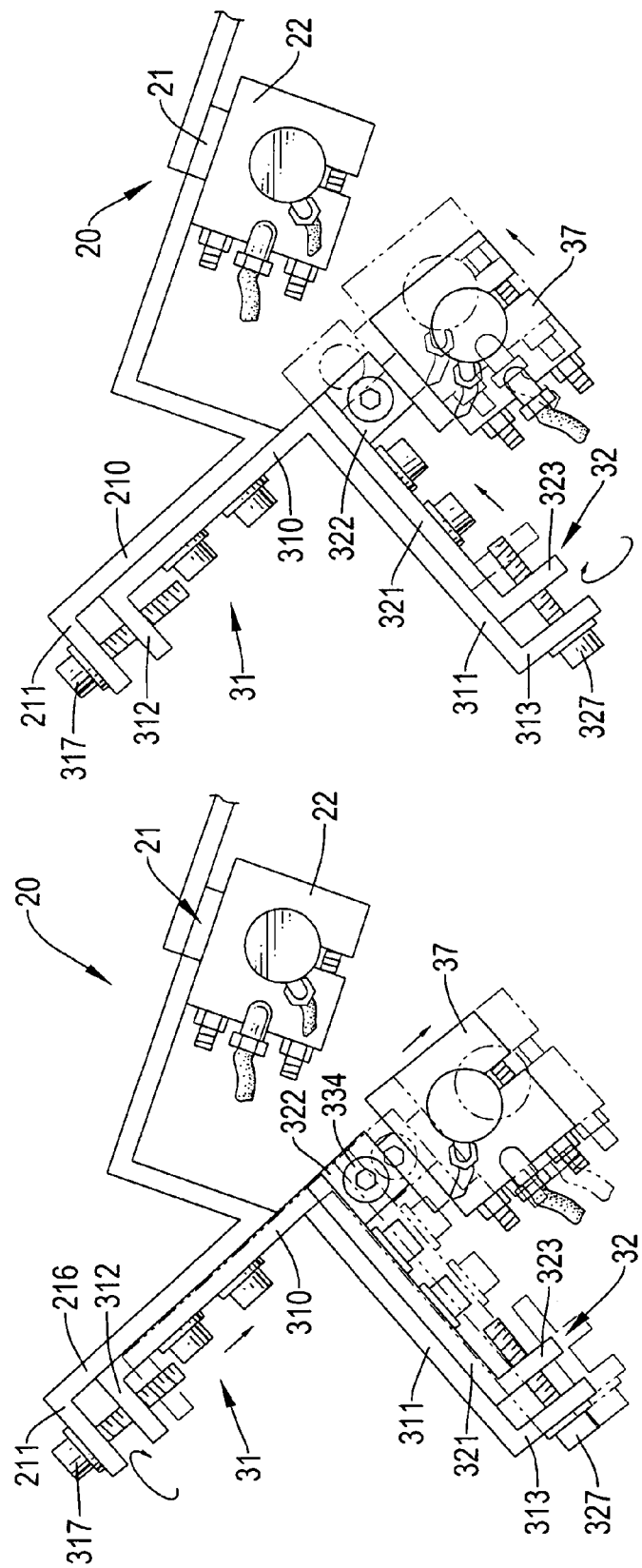

WATER-PROOF FILM LAMINATING MACHINE

BACKGROUND OF THE INVENTION

1. Field of the Invention

The present invention relates to a water-proof film laminating machine, especially to a water-proof film laminating machine with adjustable discharging air tubes.

2. Description of Related Art

A polar fleece texture is a fine and delicate texture with fleece-like hairs on the texture. Polar fleece texture may use for the lining of sleeping bag, the lining of garment, purses, sporting bags, computer case, camera bags, medical goods, healthcare goods, girdle and sphygmomanometer.

With reference to FIG. 1, two polar fleece textures (1) are shown. Each texture (1) has a top, a bottom, multiple fine hairs (2) and a water-proof layer (3). The fine hairs (2) are formed on the top of the texture (1). The water-proof layer (3) is mounted on the bottom of the texture (1). When two polar fleece textures (1) are combined by sewing (4), water may permeate at the sewing (4) and destroy the water-proof layer (3), so the polar fleece texture (1) will no longer be water-proofing. To overcome the above shortcoming, a water-proof film (5) is attached over the sewing (4). The fine hairs (2) need to be scraped off before the water-proof film (5) is attached. However, to scrape the fine hairs (2) cleanly is difficult and may break the texture (1). Furthermore, when the water-proof film (5) is attached to the texture (1), the film (5) may be with wrinkles and make the final product unsightly.

To overcome the shortcomings, the present invention tends to provide a water-proof film laminating machine to mitigate the aforementioned problems.

SUMMARY OF THE INVENTION

The primary objective of the present invention is to provide a water-proof film laminating machine that is convenient for use.

A water-proof film laminating machine has a laminating machine body, a top roller, a bottom roller, multiple connecting devices, a cylinder, a first holder, a second holder and a cooling device. The holders are connected to the connecting devices and driven by the cylinder. The holders provide heat to melt a film attaching on a texture and the holders can be adjusted to focus on the film precisely. The cooling device cools down a high temperature from the melting film.

When the water-proof film laminating machine is in use, a texture is put between the rollers and the film is attached on texture by melting the film. By adjusting the holders, the film will attach to the texture precisely and be cooled down quickly.

Other objects, advantages and novel features of the invention will become more apparent from the following detailed description when taken in conjunction with the accompanying drawings.

BRIEF DESCRIPTION OF THE DRAWINGS

FIG. 6 is an operational top view of the water-proof film laminating machine in FIG. 2 showing that the holder of exhausting dusts is adjusted;

FIG. 7 is an operational top view of the water-proof film laminating machine in FIG. 2 showing that the holder of exhausting dusts is adjusted.

DETAILED DESCRIPTION OF THE PREFERRED EMBODIMENT

Figure 1:
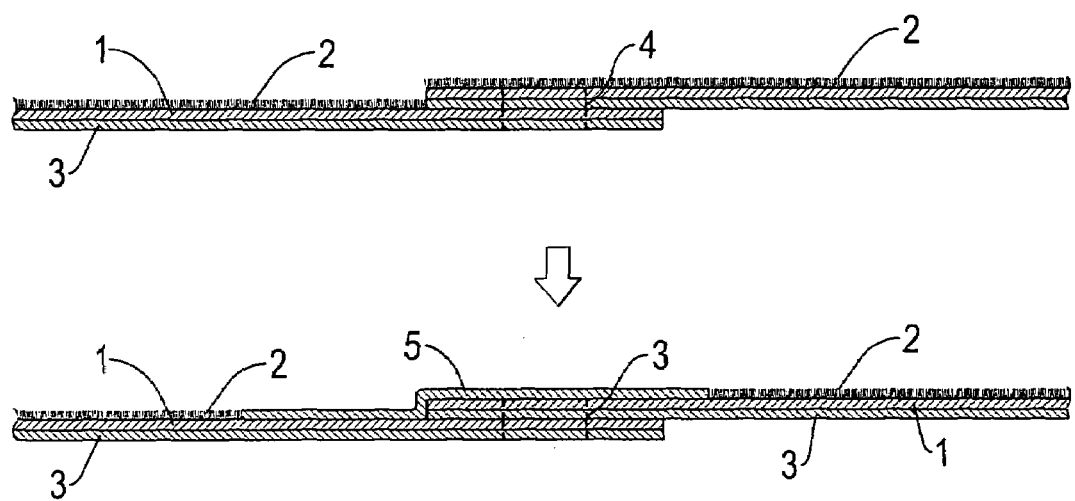
FIG. 1 is a side plane view of a conventional polar fleece texture in accordance with the prior art.
Figure 2:
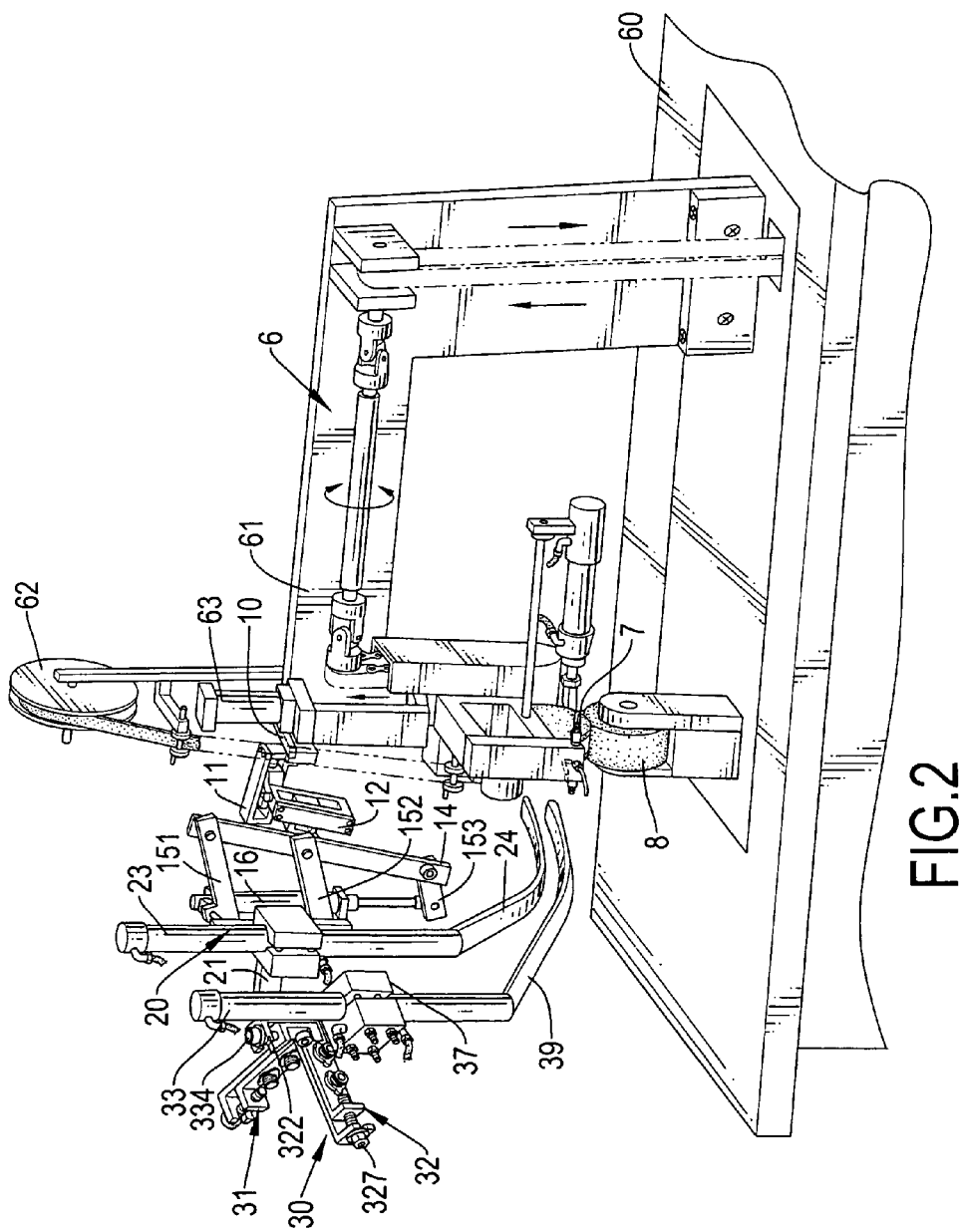
FIG. 2 is a perspective view of a water-proof film laminating machine in accordance with the present invention.
Figure 3:
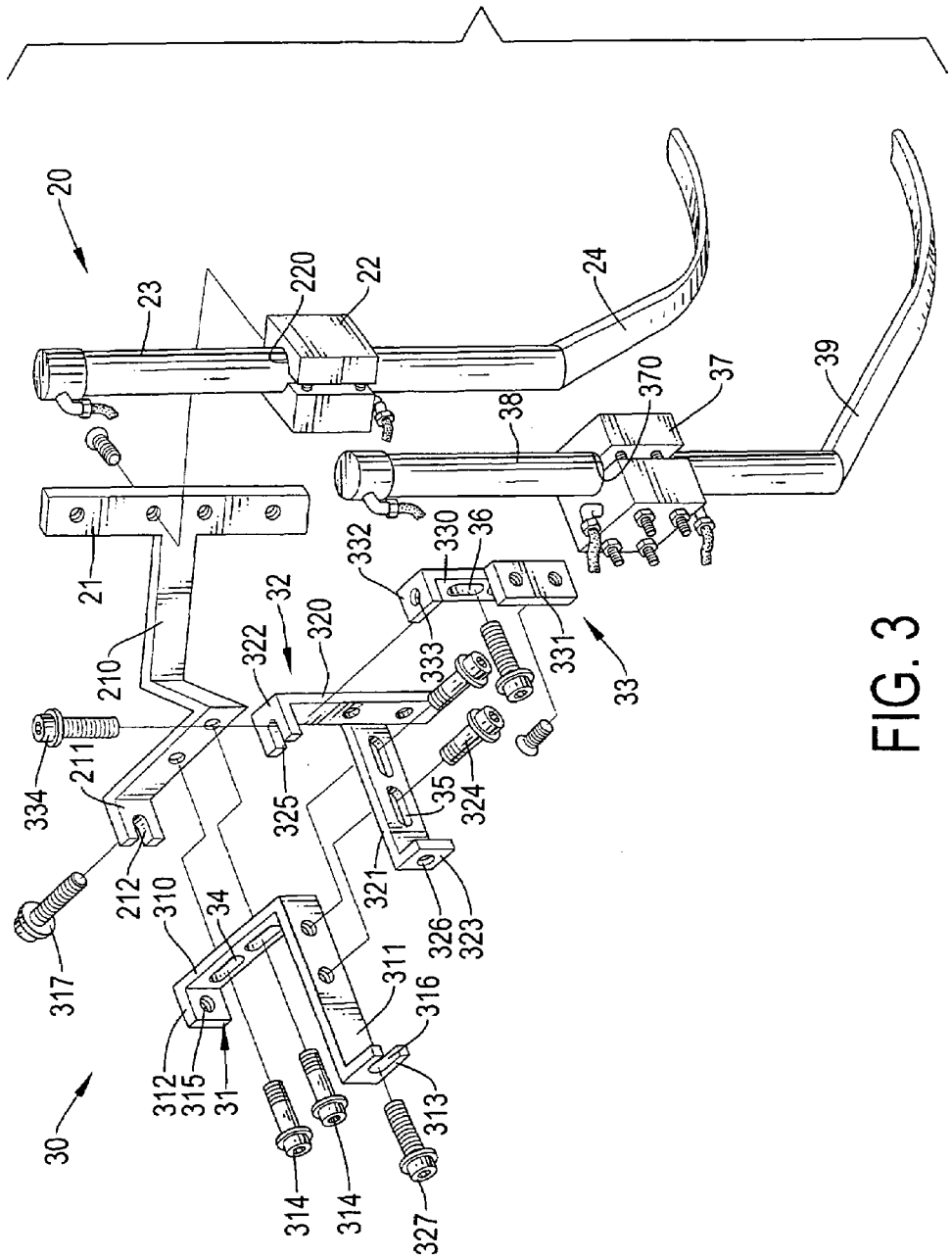
FIG. 3 is an enlarged exploded perspective view of the water-proof film laminating machine in FIG. 2.

With reference to FIGS. 2 and 3, a water-proof film laminating machine in accordance with the present invention has a laminating machine body (6), a top roller (7), a bottom roller (8), a first connecting device (10), a second connecting device (11), a third connecting device (12), a connecting arm (14), three pivotal arms (15), a cylinder (16), a first holder (20), a second holder (30) and a cooling device (40).

The laminating machine body (6) is used for supporting the other elements of the laminating machine and has a working table (60), a base (61), a film holder (62) and a cylinder (63). The base (61) is mounted on the working table (60) and has a working surface and a top. The film holder (62) is mounted on the top of the base (61) for holding the water-proof film (5). The cylinder (63) is mounted on the base (61).

The bottom roller (8) is mounted on the working table (60) of the laminating machine body (6).

The top roller (7) is connected to the cylinder (63) and is mounted on the base (61) of the laminating machine body (6). The top roller (7) can be driven by the cylinder (63) to press against the bottom roller (8).

The first connecting device (10) is horizontally mounted on the working surface of the base (61) and extended out of the working surface of the base (61).

The second connecting device (11) is horizontally connected to the first connecting device (10). The position of the second connecting device (11) is adjustable relative to the first connecting device (10) along a first direction.

The third connecting device (12) is connected to the bottom of the second connecting device (11). The position of the third connecting device (12) is adjustable relative to the second connecting device (11) along a second direction substantially perpendicular to the first direction.

The connecting arm (14) is mounted on the third connecting device (12) and has a top pivoted site, a middle pivoted site and a bottom pivoted site.

The three pivotal arms include a topmost pivotal arm (151), a middle pivotal arm (152) and a lowermost pivotal arm (153), are respectively and pivotally connected to the pivoted sites of the connecting arm (14). The topmost pivotal arm (151) has a first surface and a second surface. The cylinder (16) has a top and an extension rod. The first surface of the topmost pivotal arm (151) and the lowermost pivotal arm (153) are pivotally and respectively mounted on the top and the extension rod of the cylinder (16), so that the cylinder (16) may be inclined when working.

The first holder (20) is connected to the second surface of the topmost pivotal arm (151) and the middle pivotal arm (152). The first holder (20) has an arm body (21), a first seat (22), a first heater (23) and a first exhausting duct (24). The arm body (21) is connected to the second surface of the topmost pivotal arm (151) and has an extended arm (210). The extended arm (210) is extended from the arm body (21) and has a distal end, a wing (211) and a holding slot (212). The wing (211) extends from the distal end of the extended arm (21). The holding slot (212) is defined in the wing (211). The first seat (22) is connected to the arm body (21) and has a through hole (220). The first heater (23) is connected to an air source and is mounted through the through hole (220) defined in the first seat (22). The first exhausting duct (24) connects to the first heater (23).

The second holder (30) is connected to the extended arm (210) and has a first mounted arm (31), a second mounted arm (32), a third mounted arm (33), a second seat (37), a second heater (38) and a second exhausting duct (39). The first mounted arm (31), which relatively moves along the arm body (21) of the first holder (20) is mounted on the extended arm (210) and forms as an L-shaped. The first mounted arm (31) has a distal segment (310), a proximal arm (311), a distal wing (312), a proximal wing (313), two elongated slots (34), two threaded pins (314) and an adjustable pin (317). The distal segment (310) is attached to the extended arm (210). The proximal arm (311) is integrally formed on the distal segment (310). The distal wing (312) is formed on the distal segment (310) and has a threaded hole (315) defined in the distal wing (312). The proximal wing (313) is formed on the proximal arm (311) and has a slot (316) defined in the proximal wing (313). The two elongated slots (34) are separately defined in the distal segment (310), and two threaded pins (314) are mounted through the elongated slots (34) for combining the distal segment (310) and the extended arm (210). The adjustable pin (317) is mounted through the slot (212) and the threaded hole (315) for adjusting the position of the first mounted arm (31). The second mounted arm (32) is attached to the arm body (21) and has a vertical segment (320), a horizontal arm (321), a vertical wing (322), a horizontal wing (323), two elongated slots (35), two threaded pins (324) and an adjustable pin (327). The vertical segment (320) is attached to the arm body (21). The horizontal arm (321) is connected to the vertical segment (320) and attached to the proximal arm (311) of the first arm (31). The vertical wing (322) is formed on the vertical segment (320) and has a slot (325) defined in the vertical wing (322). The horizontal wing (323) is formed on the horizontal arm (321) and has a threaded hole (326) defined in the horizontal wing (323). The two elongated slots (35) are defined in the horizontal segment (320), and the two threaded pins (324) are mounted through the elongated slots (35) for combining the first arm (31) and the second mounted arm (32). The adjustable pin (327) is mounted through the slot (316) in the first mounted arm (31) and the threaded hole (323) in the second mounted arm (32) for adjusting the position of the second mounted arm (32). The third mounted arm (33) is attached on the second arm (32) and relatively moves along the second mounted arm (32). The third mounted arm (33) has a vertical distal arm (330), a vertical plate (331), a top wing (332), two elongated slots (36) and an adjustable pin (334). The vertical distal arm (330) is attached to the vertical segment (320) of the second arm (32). The top wing (332) is formed on the vertical distal arm (330) and has a threaded hole (333) defined in the top wing (332). The two elongated slots (36) are respectively defined through the vertical distal arm (330) of the third arm (33). The adjustable pin (334) is mounted through the slot (325) in the second mounted arm (32) and the threaded hole (333) in the third mounted arm (33) for adjusting the position of the third mounted arm (33). The second seat (37) is mounted on the vertical plate (331) of the third arm (33) and has a through hole (370). The second heater (38) is connected to an air source and is mounted through the through hole (370) in the second seat (37). The second exhausting dust (39) is connected to the second heater (38).

Figure 8:
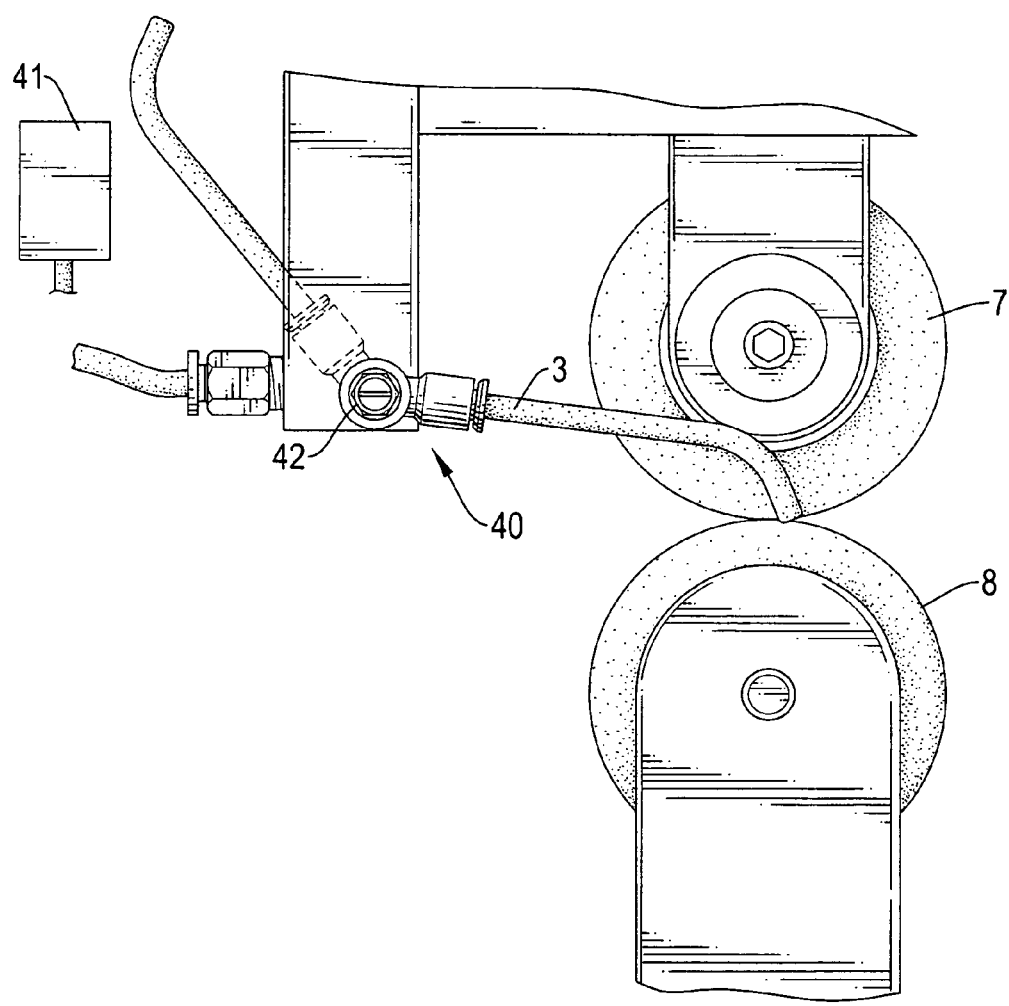
FIG. 8 is a side plane view of the top roller and the bottom roller of the water-proof film laminating machine in FIG. 2.

With further reference to FIG. 8, the cooling device (40) is mounted on the base (61) of the laminating machine body (6) near to the top roller (7) and has an air provider (41), a control valve (42) and two discharging dusts (43). The control valve (42) is mounted on base (61) of the laminating machine body (6) and is connected to the air provider (41) for controlling air input. The discharging dusts (43) are respectively mounted beside the top roller (7) for providing air and cooling down the molten fine hair on the polar fleece texture (1).

Figure 5:
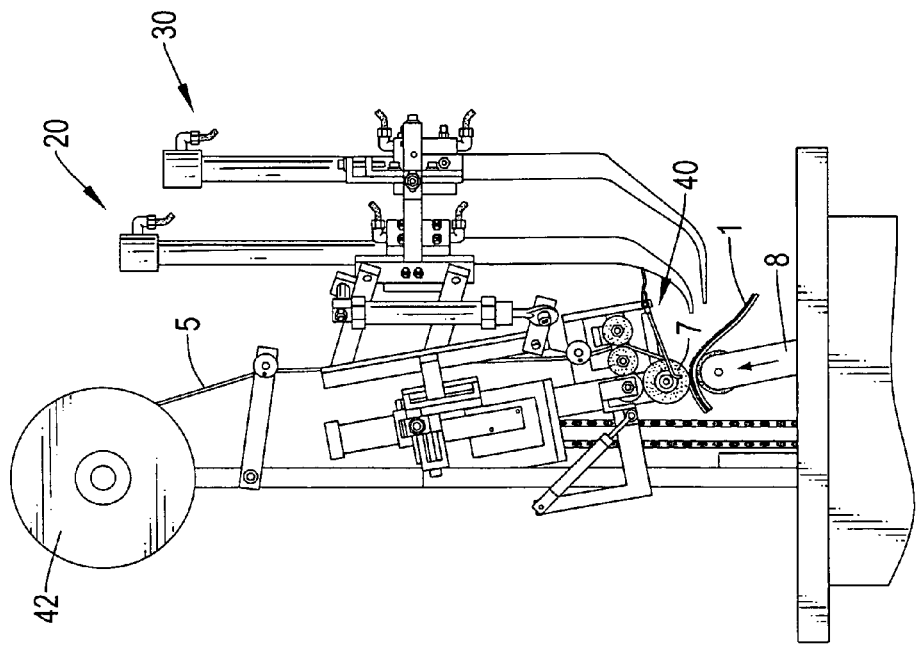
FIG. 5 is an operational side plan view of the water-proof film laminating machine in FIG. 2 showing that the exhausting dusts are moved downward.
Figure 4:
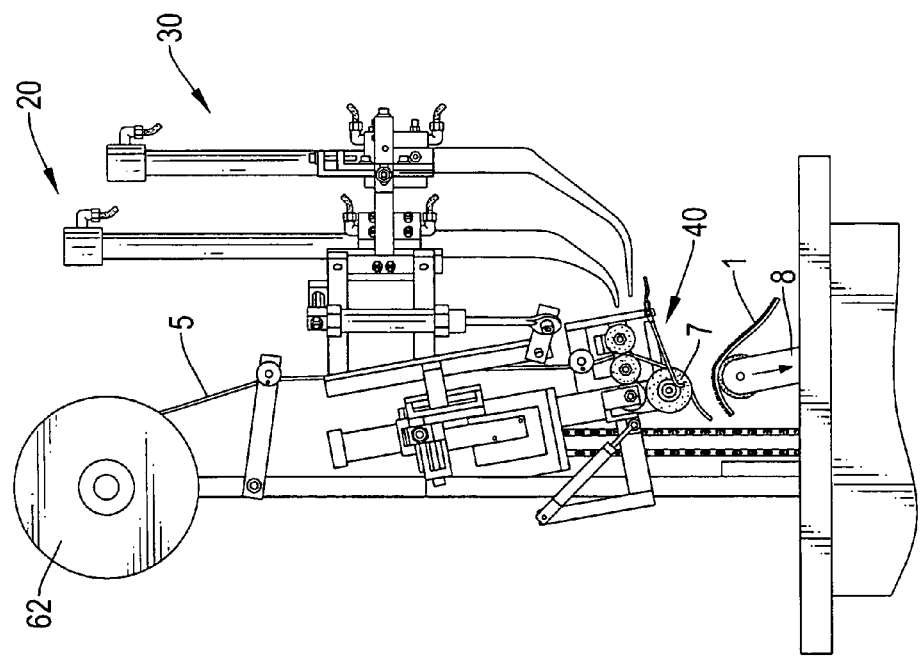
FIG. 4 is an operational side plane view of the water-proof film laminating machine in FIG. 2.

With reference to FIGS. 4 and 5, before the water-proof film laminating machine is in use, a polar fleece texture (1) is put on the bottom roller (8), and a water-proof film (5) is rolled on the film holder (62) while the first holder (20) and the third holder (30) are at a pre-preparation position. Then, the top roller (7) is pressed against the bottom roller (8) by the cylinder (63) mounted on the base (61), and the water-proof film (5) passes between the two rollers (7, 8) and is pressed to attach onto the polar fleece texture (1). Finally, the first holder (20) and the second holder (30) are put at a ready position by adjusting the connecting devices (10, 11, 12, 13, 14, 151, 152,153) for providing hot air to melt fine hairs (2) on the polar fleece texture (1) and to make the water-proof film (5) melt and combined with the polar fleece texture (1).

With reference to FIGS. 6 and 7, to make the first holder (20) and the second holder (30) aim at the water-proof film (5) and the polar fleece texture (1) precisely, the second holder (30) may be adjusted by relatively moving the first arm (31) along the extended arm (210) of the arm body (21) by rotating the adjustable pin (317). Also, the second holder (30) may be adjusted by relatively moving the second mounted arm (32) along the proximal arm (311) of the first mounted arm (31) by rotating the adjustable pin (327). Furthermore, the second holder (30) may be adjusted by relatively moving the third arm (33) along the vertical segment (320) of the second mounted arm (32) by rotating the adjustable pin (334). Therefore, the exhausting dusts (24, 39) will aim at the water-proof film (5) and the polar fleece texture (1) precisely.

With further reference to FIG. 8, the cooling device (40) mounted on the base (61) provides air when the water-proof film (5) is attached on the texture (1) for cooling down the melt water-proof film (5) that has been combined with the texture (1). Therefore, the final product will be more neatly.

The advantages of the water-proof film laminating machine in accordance with the present invention are described as follow.

1. The holders (20, 30) may aim at the water-proof film (5) and the texture (1) more precise simply by rotating the adjustable pins (317, 327, 334) mounted through the arms (31, 32, 33) of the second holder (30).

2. The attached water-proof film (5) will be cooled down quickly by the cooling device (40) mounted beside the top roller (7). Therefore, a neat and plan texture is obtained.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A water-proof film laminating machine comprising:
   a laminating machine body having
      a working table,
      a base mounted on the working table and having a working surface and a top,
      a film holder mounted on the top of the base for holding the water-proof film, and
      a cylinder mounted on the base,
   a bottom roller mounted on the working table of the laminating machine body,
   a top roller connected to the cylinder and mounted on the base of the laminating machine body and corresponding to and selectively pressing against the bottom roller,
   a first connecting device horizontally mounted on the working surface of the base of the laminating machine body,
   a second connecting device adjustably connected to the first connecting device along a first direction,
   a third connecting device adjustably connected to the second connecting device along a second direction,
   a connecting arm mounted on the third connecting device and having a top pivoted site, a middle pivoted site and a bottom pivoted site,
   three pivotal arms including a topmost pivotal arm, a middle pivotal arm and a lowermost pivotal arm and separately and pivotally connected to the pivoted sites of the connecting arm,
   a cylinder having a top and an extension rod, the top and the bottom of the cylinder mounted respectively on the topmost and the lowermost pivotal arms,
   a first holder connected to the topmost and the middle pivotal arms and having
      an arm body connected to on the topmost pivotal arm and having
         an extended arm extended from the arm body and having
            a distal end,
            a wing extending from the distal end of the extended arm, and
            a holding slot defined in the distal end of the extended arm,
      a first seat connected to the arm body and having a through hole,
      a first heater mounted through the through hole defined in the first seat, and
      a first exhausting duct connecting to the first heater, and
   a second holder connected to the extended arm and having
      a first mounted arm adjustably mounted on the extended arm and having
         a distal segment attached to the extended arm,
         a proximal arm integrally formed on the distal segment,
         two elongated slots separately defined in the distal arm, and
         two threaded pins mounted through the elongated slots,
      a second mounted arm adjustably attached to the arm body and having
         a vertical segment attached to the arm body,
         a horizontal arm connected to the vertical segment and attached to the proximal arm of the first arm,
         two elongated slots defined in the horizontal arm, and
         two threaded pins mounted through the elongated slots,
      a third mounted arm adjustably attached on the second arm and having
         a vertical distal arm attached to the vertical arm of the second arm,
         a vertical plate, and
         two elongated slots respectively defined in the vertical distal arm of the third arm,
      a second seat mounted on the vertical plate of the third arm and having a through hole,
      a second heater mounted through the through hole in the second seat, and
      a second exhausting duct connected to the second heater.

2. The water-proof film laminating machine as claimed in claim 1, wherein the water-proof film laminating machine further comprises a cooling device mounted on the laminating machine body near the top roller and having
   an air provider,
   a control valve mounted on the laminating machine body for controlling air input, and
   two discharging dusts respectively mounted beside the top roller for providing air.

3. The water-proof film laminating machine as claimed in claim 1, wherein the first mounted arm of the second holder further comprises
   a distal wing formed on the distal segment and having a threaded hole defined in the distal wing,
   a proximal wing formed on the proximal arm and having a slot defined in the proximal wing, and
   an adjustable pin mounted through the slot in the extended arm of the arm body and the threaded hole in the distal wing of the first mounted arm for adjusting the position of the first mounted arm,
   the second mounted arm of the second holder further comprises
   a vertical wing formed on the vertical segment and having a slot defined in the vertical wing,
   a horizontal wing formed on the horizontal arm and having a threaded hole defined in the horizontal wing,
   an adjustable pin mounted through the slot in the first mounted arm and the threaded hole in the second mounted arm for adjusting the position of the second mounted arm, and
   the third mounted arm of the second holder further comprises
   a top wing formed on the vertical distal arm and having a threaded hole defined in the top wing
   an adjustable pin mounted through the slot in the second mounted arm and the threaded hole in the third mounted arm for adjusting the position of the third mounted arm.

* * * * *